US005658379A

United States Patent [19]

Battilana

[11] Patent Number: 5,658,379
[45] Date of Patent: Aug. 19, 1997

[54] WOOD FILLER

[76] Inventor: Giovanni Battilana, 1 Rayburn Court, Bolton, Ontario, Canada, L7E 5R8

[21] Appl. No.: 484,879

[22] Filed: Jun. 7, 1995

[51] Int. Cl.$^6$ .............................. C04B 11/00; C09D 5/34
[52] U.S. Cl. .................... 106/785; 106/461; 106/464; 106/465; 427/140; 427/371
[58] Field of Search ................... 106/461, 464, 106/772, 785, 465; 427/140, 371

[56] References Cited

U.S. PATENT DOCUMENTS

| 1,188,977 | 6/1916 | Motter | 106/464 |
| 3,687,890 | 8/1972 | Susuki et al. | 106/464 |

OTHER PUBLICATIONS

Chemical Abstract No. 110:9833 of Japanese Patent Specification No. 63-189487 published on Aug. 5, 1988.
Chemical Abstract No. 118:149591 of Brazilian Patent No. 9101562 published on Mar. 3, 1992.
Chemical Abstract No. 122:216818 of Chinese Patent No. 1078988 published on Dec. 1, 1993.
Chemical Abstract No. 122:136353 of Japanese Patent Specification No. 60172688 published on Jun. 21, 1994.
Brochure of Canadian Gypsum Company, Limited, "CGC Durabond Asbestos Free Joint Compounds"©1983 No Month.
Brochure of Canadian Gypsum Company, Limited (CGC) "Durabond and Sheetrock"©1983 No Month.

*Primary Examiner*—Anthony Green
*Attorney, Agent, or Firm*—Fredrikson & Byron, PA

[57] ABSTRACT

The present invention provides a filler for wood products, especially those intended for indoor use. This filler can include a putty including a mixture of calcium sulphate and calcium oxide (or a compound forming calcium oxide when heated); at least one mineral pigment; and an agent for retarding the setting of the putty. The invention also contemplates a method for filling wood products. In accordance with this method, one fills an orifice within the wood product with a filler which includes a putty including a mixture of calcium sulphate and calcium oxide (or a compound forming calcium oxide when heated); and at least one mineral pigment. The filler is then smoothed and a surface of the filled wood product is finished.

18 Claims, 4 Drawing Sheets

FIG. IA
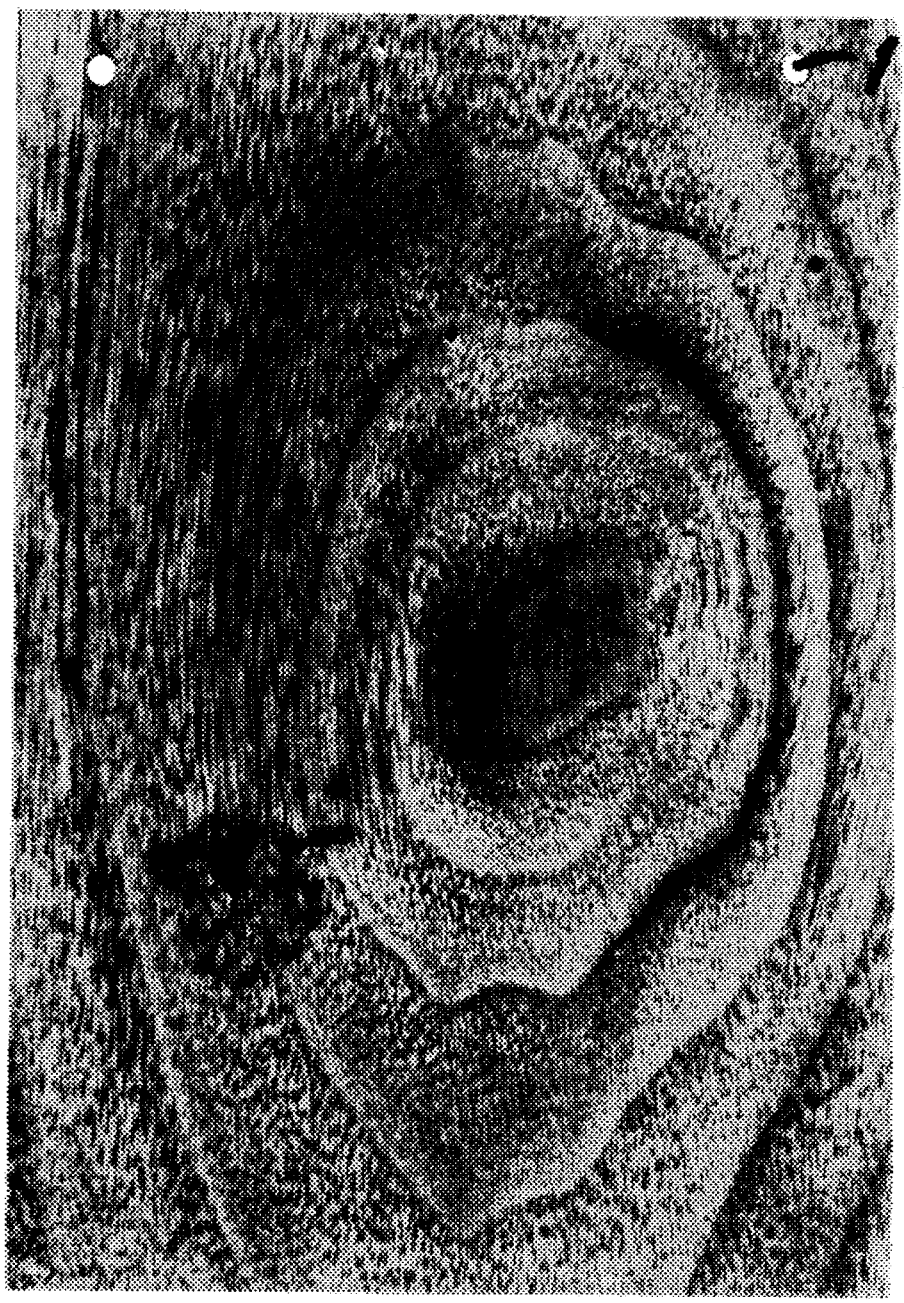

FIG. IB

WOOD FILLER

FIELD OF THE INVENTION

The present invention relates to a filler for wood products that are intended to be used indoor, including furniture, mantelpieces and panelling, and particularly to a wood filler that is capable of being finished, and stained, and specially to a wood filler that may be wetted as part of the finishing step.

BACKGROUND TO THE INVENTION

Fillers are used in the wood industry, particularly in construction and in the furniture industry, in order to repair the wood where it has cracked, where it has been necessary to drill holes or the like during the fabrication process, or in the repair of damage to the wood product. The demands on the product properties for such fillers when the wood is to be painted are not high, provided that a smooth surface can be obtained. However, when the wood must retain its natural beauty e.g. it is to be stained so as to show its natural grain, the requirements on the filler are substantially more demanding. In the latter case, it becomes very important that the filler be able to match the color of the wood, including after any staining, so that it is not readily apparent that a filler has been used on the wood.

Fillers on the marker that are intended for use with wood tend to be of a type generally known as a plastic wood which often are products that are both potentially toxic to persons using the product and highly flammable. As these products are used indoors, there is a potential hazard to persons who suffer from, for example, allergies, and in any event the odors e.g. from solvents, associated with use of the product tend to be obnoxious to persons working with the product. Moreover, plastic wood becomes very hard when it has set, and it must be sanded down where needed. This is a labour intensive process, and a process that is difficult on shaped mouldings. Plastic wood tends to shrink on drying, making it susceptible to separation or falling out of the hole that it has filled. In addition, plastic wood tends to come in pre-determined colors, which must be purchased specifically for the intended use. Plastic wood is generally regarded as not accepting stain, tending to remain substantially the original colour if staining is attempted. Consequently, it is difficult to select an amount of filler that is appropriate for the particular job requiring repair, with the result that part of the filler usually has to be discarded, and plastic wood tends to be unpleasant to work with.

One of the methods of coloring fillers currently available is to use a colored crayon, which is an oil-based product. The oil content within the crayon often results in staining of the wood around where the filler has been used, leaving a distinct mark such that the location of where the filler was used is apparent. Moreover, as illustrated hereinafter, during use of plastic wood to fill a hole, it is normally necessary to use a tool to force the plastic wood into the hole and smooth the surface. This leaves an area around the hole that is difficult to stain, due to contact with the plastic wood, even after attempts to clean and sand the area around the hole that came into contact with the plastic wood.

Use of plastic wood in the furniture business is labour intensive, especially to smooth the surface of the plastic wood. In addition, plastic wood requires a long period of time to set, resulting in both delays in furniture production and labour intensive steps.

SUMMARY OF THE INVENTION

A versatile product for use in the filling of wood products, especially for use in the furniture industry, could offer advantages to the industry.

Accordingly, the present invention provides a filler for wood products intended for indoor use, comprising (a) a putty formed from calcium sulphate, especially hydrated calcium sulphate, and calcium oxide, or a compound forming calcium oxide when heated, especially calcium carbonate; and (b) a mineral pigment, especially a mineral pigment comprising one or more oxide of iron.

In preferred embodiments of the invention, the putty is formed by heating a mixture of calcium sulphate, especially hydrated calcium sulphate, and calcium oxide, or a compound that forms calcium oxide when heated, especially calcium carbonate, to remove water therefrom to form the putty.

In another embodiment, the putty contains an agent for retarding the setting of the putty.

The present invention further provides a kit consisting essentially of:

(a) a putty formed from calcium sulphate, especially hydrated calcium sulphate, and calcium oxide, or a compound that forms calcium oxide when heated, especially calcium carbonate; and (b) a mineral pigment, especially a mineral pigment comprising one or more oxide of iron.

In addition, the present invention provides a method for filling wood products intended for indoor use, comprising:

filling an orifice within the wood product with a filler comprising:

(a) a putty formed from calcium sulphate, especially hydrated calcium sulphate, and calcium oxide, or a compound that forms calcium oxide when heated, especially calcium carbonate; and (b) a mineral pigment, especially a mineral pigment comprising one or more oxide of iron, smoothing the filler, and finishing the filled wood product.

In an embodiment of the process of the invention, the filled wood product, prior to finishing, is wetted and then smoothed.

In another embodiment, a damp material e.g. a damp cloth, is used in smoothing the filler.

BRIEF DESCRIPTION OF THE DRAWINGS

FIGS. 1A and 1B show a sample of wood that has been repaired using a plastic wood and using a filler of the invention, respectively, and subsequently stained with a dark stain.

DETAILED DESCRIPTION OF THE INVENTION

Figure 2A:
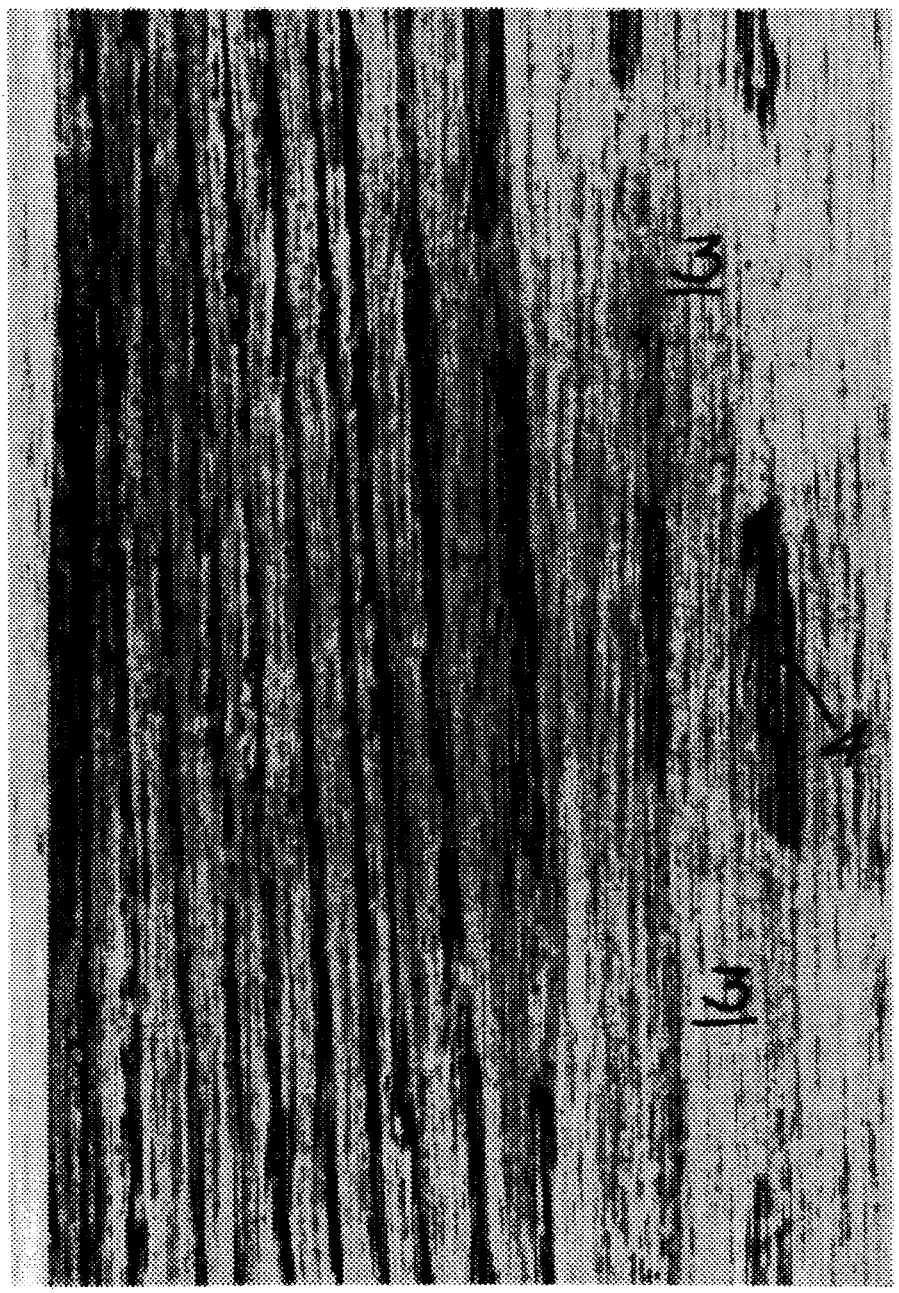
FIGS. 2A and 2B show another sample of wood filled with plastic wood and with a filler of the invention and stained.

The filler used in the present invention is formed from a putty and a mineral pigment. The putty is formed from calcium sulphate especially calcium sulphate in the form of hydrated calcium sulphate, and calcium oxide, or a compound that forms calcium oxide on heating. It is particularly preferred that the calcium oxide be in the form of calcium carbonate. Mixtures of the calcium sulphate and calcium oxide, especially calcium carbonate, are heated to remove water, to form the putty. The putty will normally also contain an agent for retarding the setting process, especially hydrolysed proteins or cream of tartar i.e. potassium bitartrate. Techniques for the manufacture of such putties are known in the art.

The filler also contains a mineral pigment, especially a mineral pigment that comprises one or more of the oxides of iron. For example, the pigment may contain a mixture of magnetite ($Fe_3O_4$), hematite ($Fe_2O_3$) and goethite ($\alpha FeOOH$). The mineral pigment may contain various ratios of such oxides of iron. In addition, the pigment may also contain calcium sulphate, especially hydrated calcium sulphate, and/or calcium carbonate.

The filler is formed as a mixture of the putty and the mineral pigment. Both the putty and the filler are normally in the form of powders. The amount of putty used depends on, for example, the particular orifice(s) in the wood that are to be filled, and the amount may be selected so that there is little excess or waste.

The amount of mineral pigment used may be varied over a wide range, depending on the particular wood for which it is intended. Moreover, one or more pigments may be used, depending on the color of the wood. Thus, for instance, a light colored mineral pigment may be blended with a darker mineral pigment to obtain a pigment of an intermediate color. Nonetheless, the filler may be stained and will accept stain to an extent that provides a similar colour to the wood that has been stained.

The putty and pigment may be mixed in a dry state, but before application to wood, a small amount of water is added to the dry mixture and the resultant mixture blended to a uniform consistency, and a consistency (viscosity) suitable for filling of holes or the like, as will be understood by persons skilled in the art. Such blending is conveniently done with a trowel, spatula or the like, water being added as necessary so that the resultant filler is in a condition that is suitable for use as a filler of holes in a wood, as will be understood by persons skilled in the art. In particular, blending would be carried out to obtain uniformity of colour in the filler.

While the filler has been described above with reference to mixing of powders of putty and pigment, it is understood that in many instances, the filler would be made available commercially in a pre-mixed form, especially in which the mixture was formulated for use with a particular wood. Thus, mixtures may be provided for particular use with maple, oak, poplar, willow or the like. Addition of an appropriate amount of water would provide the filler in a form suitable for use.

The filler is applied to a wood product to fill an orifice of some kind e.g. a crack or a knot hole that has been formed in the wood product e.g. during assembly of furniture at which time holes may have to be formed in order to attach two pieces of wood together, or for the repair of damage to a wood product. The filler is inserted into the orifice and smoothed. The smoothing may be carried out by a sanding operation, either using a sander or by hand. The filler is of uniform colour with depth, so that wood may be sanded down with the filled section retaining the same colour. Moreover, the filler may be wetted with, for instance, a damp cloth in order for the filler to be smoothed to more closely match the orifice that is being filled, and to provide a smooth surface thereon. This may be carried out quickly with a damp cloth, and such ease of smoothing is a particular advantage of the filler of the invention, especially where the surface of the wood is contoured and not readily sanded by hand or with a sander. Subsequently, the filled wood product may be stained or some other finish may be applied to the surface of the wood product to seal the wood product.

The filler may also be painted, normally requiring only one coat of paint to match the colour of the remainder of the painted article. In contrast, plastic wood normally requires more than one coat of paint to achieve the same result. The net result is a saving in both time and materials.

The filler may be supplied in the form of a kit, of which one part is the putty and the other part is mineral pigment. The kit may comprise the putty and one mineral pigment, but would preferably be comprised of the putty and more than one mineral pigment, to allow a user to blend the pigment into the putty in their required manner in order to match the wood product that is being filled. However, the amount of pigment required is only a small percentage of the filler, generally less than about 5% by weight and especially less than 1% by weight. Thus, the filler would more likely be supplied to consumers in the form of a premixed filler intended for use with a particular type of wood, thereby enabling the consumer to purchase a small quantity of filler off the shelf for use with a particular wood.

The filler is particularly useful in the repair of wood products, especially in the furniture industry. It is essentially non-toxic, is versatile and easy to use, and further provides a filled or repaired wood product in which the filled area is relatively hard to detect.

The present invention is illustrated by the following examples:

EXAMPLE I

In the fabrication of a mantelpiece for a fireplace, tests were conducted using a sample of commercially-available plastic wood and using a sample of a filler of the invention. The latter was formed from Durabond™ 90 compound and a small amount (less than about 1%) of a mineral pigment of the type described herein. Durabond 90 compound is available from Canadian Gypsum Company Limited, and is a understood to be a putty of the type described herein.

The plastic wood took 27 minutes to apply to the cracks. It was found that it was difficult to apply and to obtain a smooth finish. After it had dried, a further 22 minutes were required to sand the filled cracks to an acceptable finish. It was further noted that the plastic wood stained the wood around where it had been used, and that this staining of the wood was not removed on sanding of the mantelpiece.

In contrast, the filler of the invention took 10 minutes to apply to similar cracks in the mantelpiece. The filler was wiped with a wet cloth to provide a smooth surface. After drying, the filler was lightly sanded to provide the surface required in the finished mantelpiece. The sanding took 17 minutes.

Sanding was carried out with a sander where possible, with moulding sections of the mantelpiece being sanded by hand.

This example shows that the filling of the cracks and the sanding was reduced from a time of 49 minutes for the plastic wood to 27 minutes for the filler of the invention. This was a saving of 22 minutes or 45% in the labour time required for the filling and sanding steps. Furthermore, the filler provided a superior finished product.

The drying time between application and sanding for plastic wood and for the filler of the invention is approximately the same, and a time longer than this drying time was allowed between application and sanding. Smoothing with water e.g. a damp cloth, may be done after such a drying time, and preferably is done so.

EXAMPLE II

FIG. 1A shows a sample of oak in which a hole was drilled and subsequently filled with a plastic wood. The sample of wood was then stained with a dark stain. The location of the drilled hole, 1, is clearly visible, as the degree of acceptance of the stain by the wood and by the plastic wood were very different. In contrast, when a similar hole in another sample of the same piece of wood was filled with a filler of the invention and stained in the same manner, the location of the hole is very difficult to see.

EXAMPLE III

FIG. 2A shows a sample of oak in which a hole was drilled and subsequently filled with a plastic wood. The sample of wood was then Stained with a light stain. The location of the drilled hole is not readily visible, but the area around where the hole was filled, 3, showed poor acceptance of the stain, in contrast to areas, 4, removed therefrom which show good acceptance of the stain. The area 3 that did not accept the stain was the area that came into contact with the plastic wood during application of the plastic wood into the hole and smoothing the surface thereof.

Figure 2B:
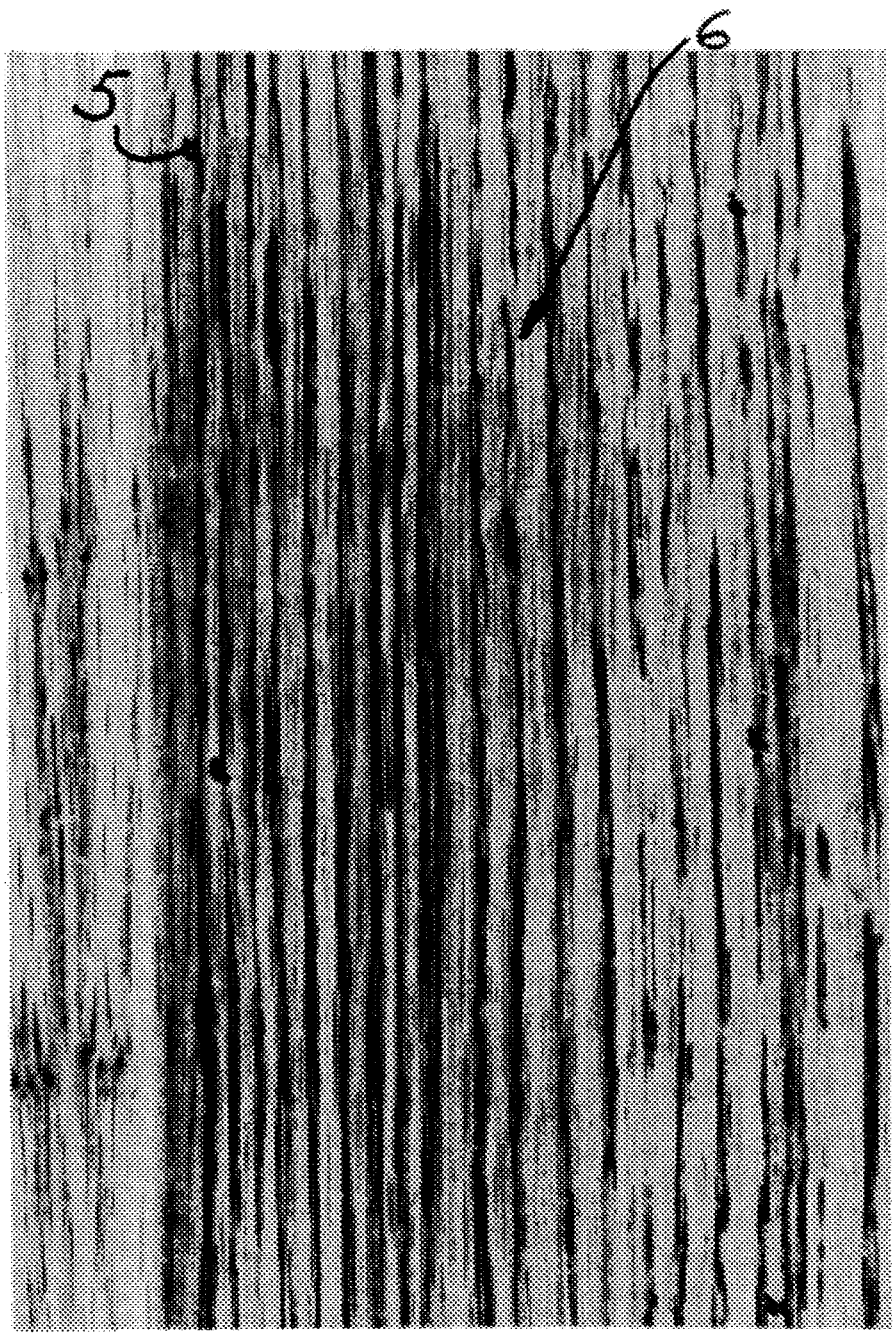

In contrast, FIG. 2B shows a sample of the same wood, viz. oak, in which a hole was drilled and subsequently filled with a filler of the invention. The sample of wood was then stained with the light stain In this instance the location of the drilled hole is visible, but is to be understood that the colour of the filler after staining can be more closely matched to the particular colour of the wood in the location of the filler; the stained filler essentially matches the colour of darker parts of the wood. However, more importantly, the area around where the hole was filled, 5, shows the same acceptance of the stain as areas, 6, removed therefrom.

I claim:

1. A filler for wood products intended for indoor use, comprising
   (a) a putty Comprising a mixture of calcium sulphate and calcium oxide, or a compound forming calcium oxide when heated,
   (b) at least one mineral pigment, and
   (c) an agent for retarding the setting of the putty.
2. The filler of claim 1 in which the filler comprises an admixture in powder form.
3. The filler of claim 1 in which the filler contains less than 5% by weight of mineral pigment.
4. The filler of claim 3 in which the putty is formed from hydrated calcium sulphate and calcium carbonate.
5. The filler of claim 3 in which the putty is formed by heating a mixture of calcium sulphate, and calcium oxide, or a compound that forms calcium oxide when heated, to remove water therefrom to form said putty.
6. The filler of claim 1 in which the filler contains less than 1% by weight of mineral pigment.
7. The filler of claim 1 in which the mineral pigment comprises at least one oxide of iron.
8. A wood filler kit consisting essentially of:
   (a) a putty Comprising a mixture of calcium sulphate, and calcium oxide, or a compound that forms calcium oxide when heated, said putty containing an agent for retarding the setting of the putty; and
   (b) at least one mineral pigment.
9. The kit of claim 8 in which said putty and said pigment are powders.
10. The kit of claim 9 in which the calcium sulphate is hydrated calcium sulphate and the calcium oxide is in the form of calcium carbonate.
11. The kit of claim 10 in which the mineral pigment comprises at least one oxide of iron.
12. The kit of claim 10 in which there is more than one mineral pigment.
13. A method for filling wood products, comprising:
    filling an orifice within the wood product with a filler, said filler comprising:
    (a) a putty comprising a mixture of calcium sulphate, and calcium oxide, or a compound that forms calcium oxide when heated, said putty containing an agent for retarding the setting of the putty; and
    (b) at least one mineral pigment; smoothing the filler; and
    finishing a surface of the filled wood product.
14. The method of claim 13 in which the filler is formed by mixing said putty, said pigments and a small amount of water.
15. The method of claim 14 in which the putty comprises hydrated calcium sulphate and calcium carbonate.
16. The method of claim 15 in which the mineral pigment comprises at least one oxide of iron.
17. The method of claim 16 in which the filled wood product, prior to finishing, is wetted and then smoothed.
18. The method of claim 16 in which a damp cloth is used in smoothing the filler.

* * * * *